UNITED STATES PATENT OFFICE 2,354,757

REFRACTORY COMPOSITION

Robert V. Kleinschmidt, Stoneham, and Edward Washken, Cambridge, Mass., assignors, by mesne assignments, to Bethlehem Steel Company, a corporation of Pennsylvania No Drawing. Original application April 23, 1941, Serial No. 389,920. Divided and this application November 2, 1942, Serial No. 464,254

4 Claims. (Cl. 106—62)

This application relates to a basic refractory composition suitable for use in exposure to basic slag and fumes and more particularly to a fused rebonded or fused and cast magnesian composition suitable for making basic open hearth pyrometer tubes or the like, and is a division of our co-pending application, Serial No. 389,920, filed April 23, 1941, now U. S. Patent No. 2,336,360.

Most commercial refractories contain substantial amounts of silica ($SiO_2$), being often composed chiefly of alumina ($Al_2O_3$) and silica, hence such refractories are strongly acid. In certain processes of ferrous metallurgy, as for instance in basic open hearth steel making, there are encountered basic slags rich in lime ($CaO$), manganese oxide ($MnO$) and the oxides of iron ($FeO$ and $Fe_2O_3$ and $Fe_3O_4$). These have a rapid solvent action on acid refractories.

Large quantities of magnesia ($MgO$) in the forms of calcined magnesite and burnt dolomite are used in basic open hearth furnaces and the slags are thus practically saturated with magnesia. It might be expected that a refractory of pure magnesia would be ideal for use in such a bath. However, such a refractory has two disadvantages. In the first place, magnesia has a peculiar attraction for iron oxide and for slags rich in iron oxides, so that such slags readily penetrate the individual grains and between the pores of a seemingly dense refractory object of pure magnesia. Even electrically fused magnesia will absorb iron oxide in solid solution. The second objection to pure magnesia is that it is mechanically weak, and tends to crack easily.

One object of this invention, therefore, is to supply a basic refractory composition of less permeability and porosity to iron-oxide slags than pure magnesia.

Another object of the invention is to produce a magnesian composition which has greater strength and resistance to cracking than pure magnesia under heat.

Another object is to produce a refractory mixture for electro-cast bricks of high load-bearing capacity for basic open hearth furnace roofs and the like.

Still another object is to provide a refractory mixture suitable for thermocouple wire protection tubes.

We have discovered that relatively small additions of alumina and silica to magnesia markedly alter its properties and produce a refractory having totally different characteristics which render it highly useful as a material in contact with basic slags, and especially with those containing considerable quantities of iron oxide. We have found that compositions containing as much as fifteen (15) per cent silica and twenty-five (25) per cent alumina with as little as sixty (60) per cent magnesia have the desirable qualities of mechanical strength, resistance to thermal shock and resistance to slag, at temperatures up to approximately 2900° F., but we prefer to use a composition containing not less than seventy (70) per cent magnesia and not greatly in excess of ten (10) per cent silica, the remainder being alumina. Such a material will resist slag attack at temperatures up to 3000° F., provided it is well fused or vitrified by firing to a closely controlled temperature around 3150° F. Even more resistant mixtures, within certain limits, may be obtained by the use of higher percentages of magnesia, but we find it essential to maintain the alumina substantially higher than the acid silica, and, in fact, to maintain as low a percentage of silica as will permit suitable vitrification.

While the above mixtures are all highly effective, we have found that in certain cases the addition of small percentages of chrome ($Cr_2O_3$) up to approximately five (5) per cent has an advantage in reducing the rate of solution of the materials in basic slag. For this purpose even as little as one (1) per cent of chrome is beneficial.

Preheated refractory test rods of various magnesian compositions were immersed in the steel and slag of an operating basic open hearth furnace for 30 seconds, the immersion times being limited because of the rapidity with which metal holders and handles were melted, and the following slag-penetration results were noted:

| Rod No. | MgO | $Al_2O_3$ | $SiO_2$ | $Cr_2O_3$ | Fused glass product | Slag penetration |
|---|---|---|---|---|---|---|
| 630 | 94 | | 1 | 5 | | Considerable. |
| 880 | 95 | | | | | Do. |
| 1,190 | 63 | 5 | | | 30 | Some. |
| 1,290 | 76 | 7 | | | 20 | Slight. |
| 1,310 | 76 | 12.5 | 10.5 | 1 | | None. |
| 1,320 | 72 | 16.5 | 10.5 | 1 | | Very slight. |
| 1,430 | 75.8 | 14.8 | 8.4 | T | | Broke on shock. |

Low resistance to slag attack due to too high a percentage of magnesia is especially apparent in rods 630 and 880, and ninety (90) per cent magnesia content is as high as will be generally usable.

As shown by rods 1190 and 1290 from 20 to 30 per cent of a fused glass product, comprised of 52.5 per cent silica, 42.5 per cent alumina, and 4.9 per cent chrome, may be used to replace the silica. While the performance of these rods was fairly good, however, the extra expense of making the fused glass product does not for most purposes appear to be worthwhile.

The mix which for convenience has been designated as 1310 is especially suitable for refractory tubes to protect the coupling wires in thermoelectric pyrometers used in measuring basic open hearth bath temperatures.

The mix used should be ground, fused in an electric furnace and reground, and then molded and fired to the neighborhood of 3150° F. A rather short melting range is characteristic of these substances, and in order to obtain maximum density it is necessary to bring them very close to the melting point. Under these conditions proper support of the molded tube or rod becomes essential. During vitrification the material shrinks considerably, and if the tubes are not supported so that they can move freely longitudinally they pull apart in short sections. If suspended freely or set on end, they are apt to flow or buckle. If suspended on magnesia or alumina, either in shapes or in grain form, they rapidly fuse into the support and stick, and as graphite burns rapidly at this temperature it is not an acceptable support.

However, a chrome brick support set at such an angle that the tubes are almost on the point of slipping longitudinally (about 52° above horizontal) has proved to be satisfactory. By firing slowly so that the chrome brick is at the temperature of the furnace at all times, uniform firing of the tube occurs. If the firing is too rapid, especially near the maximum temperature, the exposed side of the tube shrinks more rapidly than the side next to the chrome brick support, and the tube will crack or warp.

Aside from care in firing, there are two alternative approaches that will materially improve the ease of manipulation of these materials on a commercial scale. The first is to use grading of particle size, with a considerable amount of fine ball mill ground material which will reduce the shrinkage on vitrification. The second is to combine a suitable quantity of the present composition with a bonding amount of a much higher melting material, which will retain the rigidity of the mass, much after the manner of wet sand or clay. For this purpose spinel ($MgO:Al_2O_3$), melting at 3875° F., is quite appropriate, and should be more coarsely ground than the lower melting material.

Mixtures ranging from 10 to 40 per cent silica, and alumina from none to 25 per cent, the remainder being magnesia, are somewhat more suitable for basic refractory bricks and basic open-hearth roofs and the like.

For illustration, this invention has been described chiefly as adapted for the making of basic refractory bricks and rods and tubes and blast furnace roofs, but is desired to have it clearly understood that refractory compositions of the type described may be used for any purpose in which resistance to basic slag or fumes is or may be desirable, and that we may use as required such substitutions, modifications or equivalents thereof as are embraced within the scope of the invention, or as are pointed out in the claims.

Having thus described our invention, what we claim as new and useful and desire to secure by Letters Patent is:

1. A refractory mixture having the following analysis: magnesia, sixty to eighty-five (60–85) per cent; alumina, upwards of approximately twelve and one-half (12½) per cent; and sufficient silica to permit vitrification but substantially less than the alumina content.

2. A basic refractory composition suitable for use in contact with iron-oxide-containing slag consisting of a mixture having the following analysis: magnesia, sixty to eighty-five (60–85) per cent; alumina, twelve and one-half to twenty-five (12½–25) per cent; and silica, ten to fifteen (10–15) per cent.

3. An electrocast basic refractory composition, consisting of a fused mixture of magnesia, about seventy (70) per cent; silica, about ten (10) per cent; and the remainder alumina.

4. The method of manufacturing a basic refractory composition which comprises mixing together in the proportions stated the following ingredients: magnesia, sixty to eighty-five (60–85) per cent; alumina, twelve and one-half to twenty-five (12½–25) per cent; and silica under fifteen (15) per cent; fusing said mixture, grinding, molding to shape, and firing slowly to about 3150° F.

ROBERT V. KLEINSCHMIDT.
EDWARD WASHKEN.